United States Patent
Sobol et al.

(10) Patent No.: US 8,966,380 B2
(45) Date of Patent: Feb. 24, 2015

(54) APPARATUS AND METHOD FOR A VIRTUAL ENVIRONMENT CENTER AND VENUES THEREOF

(75) Inventors: Ronen Sobol, Tel Aviv (IL); Guy Piekarz, Sunnyvale, CA (US)

(73) Assignee: Unisfair, Ltd., Tel Aviv (IL)

( * ) Notice: Subject to any disclaimer, the term of this patent is extended or adjusted under 35 U.S.C. 154(b) by 902 days.

(21) Appl. No.: 12/506,741

(22) Filed: Jul. 21, 2009

(65) Prior Publication Data

US 2011/0022970 A1 Jan. 27, 2011

(51) Int. Cl.
*G06F 3/00* (2006.01)
*G06Q 10/00* (2012.01)
*G06F 3/0481* (2013.01)
*H04L 29/08* (2006.01)

(52) U.S. Cl.
CPC ............ *G06Q 10/00* (2013.01); *G06F 3/04815* (2013.01); *H04L 67/306* (2013.01); *H04L 67/104* (2013.01); *H04L 67/1046* (2013.01)
USPC ............ 715/751; 715/757; 715/753; 715/759

(58) Field of Classification Search
CPC ......... G06F 3/0481; G06F 3/011; H04N 7/15; H04N 7/155; H04N 7/157; H04L 12/1813; H04L 67/104; H04L 67/1046; G06Q 10/10; G06Q 10/101
USPC .................................. 715/757, 751, 753, 759
See application file for complete search history.

(56) References Cited

U.S. PATENT DOCUMENTS

| | | | |
|---|---|---|---|
| 6,594,664 B1 | 7/2003 | Estrada et al. | |
| 6,636,889 B1 | 10/2003 | Estrada et al. | |
| 6,728,762 B1 | 4/2004 | Estrada et al. | |
| 6,732,148 B1 | 5/2004 | Estrada et al. | |
| 6,748,425 B1 | 6/2004 | Duffy et al. | |
| 6,772,393 B1 | 8/2004 | Estrada et al. | |
| 7,012,627 B1 * | 3/2006 | Estrada et al. | 715/732 |
| 7,036,082 B1 | 4/2006 | Dalrymple et al. | |
| 7,050,079 B1 | 5/2006 | Estrada et al. | |
| 7,237,002 B1 | 6/2007 | Estrada et al. | |
| 7,590,688 B2 | 9/2009 | Franke | |
| 2001/0014865 A1 * | 8/2001 | Franke | 705/1 |
| 2002/0062403 A1 | 5/2002 | Burnett et al. | |
| 2002/0161663 A1 * | 10/2002 | Kang et al. | 705/26 |
| 2002/0174059 A1 | 11/2002 | Guo | |
| 2003/0014373 A1 | 1/2003 | Perge et al. | |
| 2003/0037110 A1 * | 2/2003 | Yamamoto | 709/204 |
| 2003/0083922 A1 | 5/2003 | Reed | |
| 2003/0156135 A1 * | 8/2003 | Lucarelli | 345/757 |
| 2003/0169305 A1 * | 9/2003 | Hodges | 345/850 |
| 2003/0177019 A1 * | 9/2003 | Santos et al. | 705/1 |
| 2004/0041836 A1 * | 3/2004 | Zaner et al. | 345/751 |
| 2004/0111472 A1 * | 6/2004 | Swanson et al. | 709/204 |
| 2005/0022139 A1 * | 1/2005 | Gettman et al. | 715/850 |
| 2005/0144022 A1 | 6/2005 | Evans | |

(Continued)

*Primary Examiner* — Weilun Lo
*Assistant Examiner* — Rashedul Hassan

(57) ABSTRACT

Various aspects of the invention include the creation of a virtual environment. A peer network is constructed with respect to the virtual business environment enables the interaction between peers as well as customization of portions of the virtual environment by authorized peers for the purpose of enabling virtual events. In addition, one aspect of the invention enables the creation of peer-to-peer networks enabling the development of cooperative businesses between a subset of peers on the network, thereby increasing collaboration between independent firms as well as automatic generation of leads.

24 Claims, 3 Drawing Sheets

(56) References Cited

U.S. PATENT DOCUMENTS

| | | | |
|---|---|---|---|
| 2006/0242581 A1* | 10/2006 | Manion et al. | 715/733 |
| 2007/0011233 A1* | 1/2007 | Manion et al. | 709/204 |
| 2007/0073607 A1 | 3/2007 | Eydelman | |
| 2008/0222295 A1* | 9/2008 | Robinson et al. | 709/227 |
| 2009/0013263 A1* | 1/2009 | Fortnow et al. | 715/753 |
| 2010/0169799 A1* | 7/2010 | Hyndman et al. | 715/757 |

* cited by examiner

APPARATUS AND METHOD FOR A VIRTUAL ENVIRONMENT CENTER AND VENUES THEREOF

TECHNICAL FIELD

This invention relates generally to virtual environments, and more specifically to methods and systems for establishing and maintaining virtual events and business-to-business partners' networks and management thereof.

BACKGROUND OF THE INVENTION

The advances in network technology in particular and the ubiquity of the Internet resulted in unprecedented opportunity of electronic conducting of business. In early days of commercial Internet web pages of a business would be made available on a server connected to the world-wide web (WWW) and made available for display. A user is able to retrieve such information by accessing a web page as long as the user was knowledgeable of the unified record locator (URL) of that web page. As time progressed additional ways have been developed to enable businesses in the form of a variety of transactions performed between a user and a company having web pages. Means for enabling commerce, such as the availability of payments through the web site, were installed and are now widely used.

Another aspect of the development of the interaction between a business and users is the ability to create virtual events. An example for a system for creating such events is described in US patent application publication No. 2002/0062403, entitled "Method and System for Creation of Virtual Events", incorporated herein by reference merely for the useful understanding of the background of the invention. This system is designed to make easier the ability to provide presentations of learning materials presented to users over the Internet. More specifically, "a virtual event engine provides a construction process, architecture, user experience and tools for organizations to easily create in real-time an organization's own custom-branded virtual event". This is a centralized system and is similar in nature to other types of event generators that are created in a central place where users can participate in an event but are not able to help create it.

There are other types of virtual reality systems that are enabled to control communications throughout the virtual environment. One such example is shown in U.S. Pat. No. 7,036,082 entitled "Controlling Communications through Virtual Reality Environment", incorporated herein by reference merely for all the useful understanding of the invention. The '082 patent describes a virtual reality system that defines a virtual environment and events that occur within the virtual environment and initiates desired real world actions when an event occurs. The system uses avatars to enable interaction as a result of motions of the avatars in the virtual environment, for example, an avatar entering a virtual office during normal business hours may initiate a phone call.

Both systems disclosed in the references mentioned above have a significant limitation of being controlled by the owner of the virtual entity. In modern business, however, there arises a need to have an additional level of sophistication. Companies may wish to peer with other companies, for example, a company may have various units within the business, each unit may have external units which it is in contact with, and with which they share information and do business. Furthermore, some of the external units may wish to perform business with respect to each other on the company's kind of product or service, providing jointly a value added product or service. This may happen between entities which are geographically distant, or, where the external entities are not even aware of each other. Prior art systems, due to the central control and other limitation are unable to provide such a business-to-business peer interactivity.

Therefore, in view of the limitations of the prior art it would be advantageous to provide a solution that enables independent interactivity by each participating entity and enhances collaboration between independent firms.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

SUMMARY OF THE INVENTION

Figure 1:
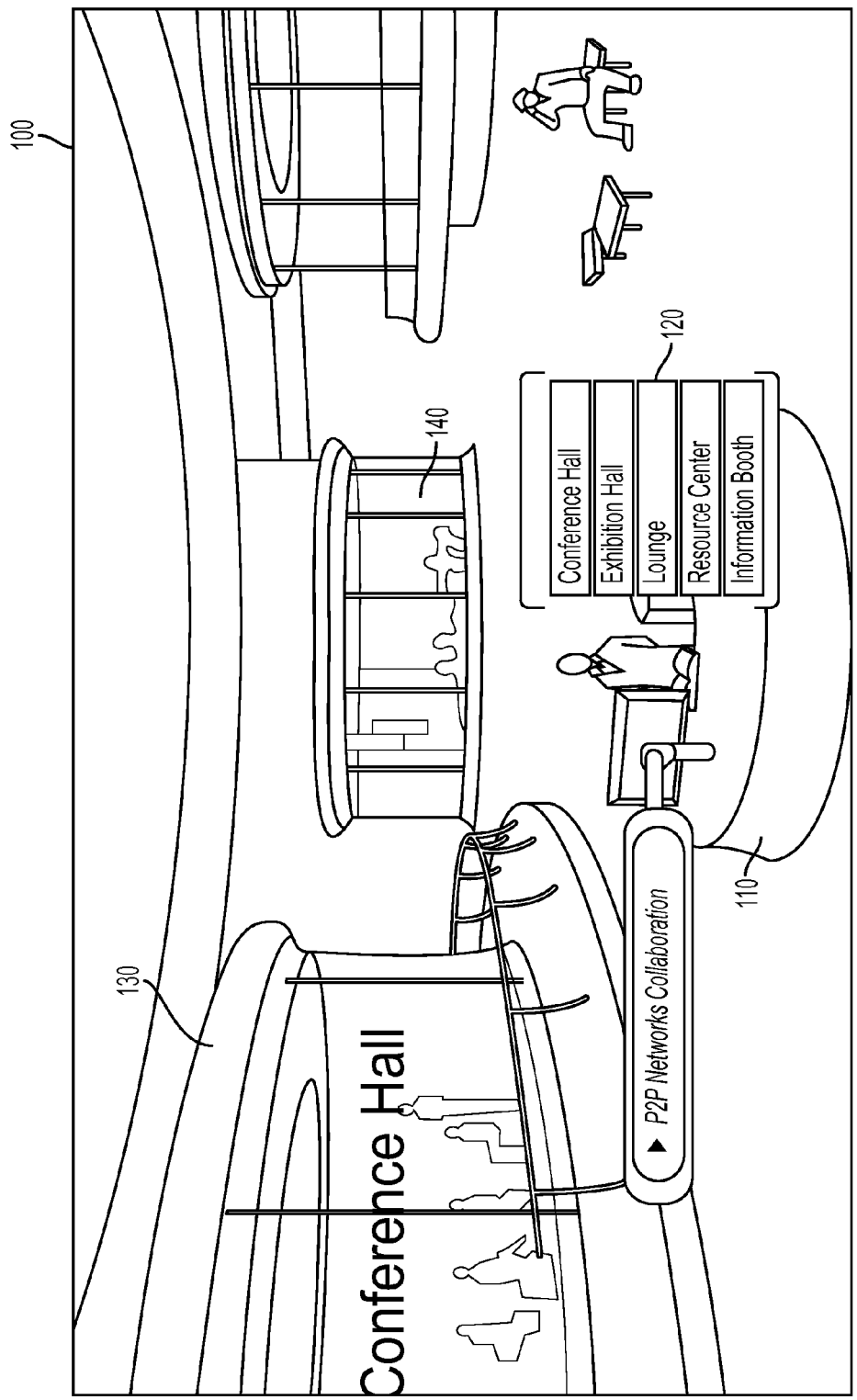
FIG. 1 is an exemplary virtual business environment implemented according to an embodiment of the invention.

Certain embodiments of the invention include a system for creation of venues. The system comprises at least one server; at least one storage unit connected to the at least one server; a network connected to the at least one servers; at least a super user of a super entity connected to the network, the super entity enforcing design constraints for a venue; and executable code in the at least one storage unit, the executable code accessible by an enabled user of the system from a first remote terminal through the network for creating at least a portion of a virtual event of the venue for display on at least a second remote terminal of a visiting user that accesses at least the virtual event, the virtual event being stored on the at least one storage unit, and further enabling at least the enabled user and the visiting user to be connected as network peers of the venue, wherein a venue enables at least one of sharing of content between peers attending the virtual event and collaboration between peers attending the virtual event.

Certain embodiments further include a virtual environment center (VEC) server. The VEC comprises a processing unit; a memory unit coupled to the processing unit; an interface to a network; executable code in the memory unit the executable code provided accessible by an enabled user connected to the VEC server from a first remote terminal through the network for creating within a venue at least a portion of a virtual event of the venue for display on at least a second remote terminal of a visiting user that accesses at least the virtual event that is stored on the memory, and further enabling at least the enabled user and the visiting user to be connected as network peers of the venue; wherein design constraints for the venue are enforced by at least a super user of a super entity, the venue enabling collaboration between users that are super users, enabled users and visiting users of the virtual event; wherein a venue enables at least one of sharing of content between peers attending the virtual event and collaboration between peers attending the virtual event.

Certain embodiments of the invention also include a method of the creation of a virtual event within a virtual environment center and the creation of venues. The method comprises creating by an enabled user of a venue of a virtual environment center (VEC) at least a portion of a virtual event; providing an access for a visiting user to view the at least portion of the virtual event; forming a peer-to-peer network of the venue; and connecting the enabled user and the visiting user to the peer-to-peer network of the venue, thereby causing the enabled user and the visiting user to interact in the venue based on at least their respective profiles; wherein a venue enables at least one of sharing of content between peers attending the virtual event and collaboration between peers attending the virtual event.

DETAILED DESCRIPTION OF THE INVENTION

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various aspects of the invention include the creation of a virtual environment. A peer network is constructed with respect to the virtual business environment enables the interaction between peers as well as customization of portions of the virtual environment by authorized peers for the purpose of enabling virtual events. In addition, one aspect of the invention enables the creation of peer-to-peer networks enabling the development of cooperative businesses between a subset of peers on the network, thereby increasing collaboration between independent firms as well as automatic generation of leads.

The intended meaning of some of the terms used hereinafter will now be mentioned for the sake of explanation and not necessarily limitation.

"Virtual Event Center" or VEC shall refer to a platform in which a Super Entity/User creates and manages Venues that share the same context. The VEC is a repository that holds and shares resources and settings, and is a console to manage them.

"Super Entity/User" shall refer to the entity and users thereof that are responsible for the creation of the virtual business environment. This may be, for example, a large corporation or entity which desires to maintain the virtual environment for increasing collaboration between the entity partners and enable them to virtually assemble at a central virtual location for the purpose of conducting business.

"Entity Partner" or "Sponsor" shall refer to a partner firm and users thereof (referred to as "Partner Users") that conduct business with the Super Entity and that have various capabilities that complement, enhance, or enable the delivery of products and/or services provided by the Super Entity. A Sponsor either owns a Location and/or has reporting rights to a Venue and/or Event and/or Location.

"Virtual Environment (VE)" or "Venue" shall refer to a persistent, virtual world built of Locations and is an image of a plurality of location accessible as rooms, booths, tables, posters, or the likes, the construction of which is under the control of the Super Entity, and that enables customization by an Entity Partner/Sponsor to fit its specific needs, the customization being within the limits allowed by the Super Entity. The Venue may contain Events within it and is hosted by the VEC.

"VE Peer Network" shall refer to a peer-to-peer network created for the purpose of supporting the VE and enabling all possible communications between Super Users or Partner Users for the purpose of conducting business in the VE.

"Sub Network of VE Peer Network" shall refer to a network created as a subset of the VE Peer Network that enables the handling of business between a subset of Entity Partners, with or without the Super Entity, for the purpose of conducting business.

"Partner Profile" shall refer to a profile stored in the system, which may be automatically created from the Super Entity database if available, but can be also entered and edited by the Entity Partner to whom the profile belongs. Similarly User Profiles can be created by Super Users and Partner Users enabling the contacting between users as described in the disclosed invention.

"Visitor" shall refer to a user having access to the VE without the privileges of a partner user or a super user. It should be noted that in certain cases a partner user or a super user may enter as a visitor for certain purposes of this system.

"Event" shall refer to a focused virtual activity, also referred to as a virtual event, performed over a limited period of time and having a finite focus, and visible under the VE. Two separate events may have certain overlaps of content, space and time. The Event maybe, without limitation, a scheduled activity (single Webcast, or a combination of locations and Webcast sessions) that share a common purpose and take place in a Venue for a limited time period. An Event is based on the Venue structure and setting.

In accordance with the invention the VEC has a public area where end-customers, Partner Users, and Super Users can all visit. The VEC may have one or more Venues, a non-limiting example of which is the Venue 100 illustrated in FIG. 1. The Venue 100 includes a virtual public conference hall 130 and a virtual partner lounge (VPL) 140. The VPL 140 is a closed environment Partners' area included in the VE Peer Network. The VCL 100 may also be designed to include other virtual entities, for example, virtual booths and the likes for connecting Super Users and/or Partner Users to Visitor for the purpose of conducting business in the VE.

In one embodiment of the invention the design of the Venue 100 looks like the inside of a building and not like an outside location with multiple buildings. The Venue 100 is the point of entry for end-customers (e.g., visitors 290 shown FIG. 2) and the VPL 140 is the point-of-entry for all Partner Users and Super Users. By providing this separation of entry points, a specialty business environment is created for Entity Partner that enables them to conduct business with each other creating ad-hoc or permanent Sub Networks of VE Peer Networks for the purpose of providing a product or a service in collaborative environment. By doing so, an infrastructure for collaboration is provided to the Partner Entities of the Super Entity that promotes its business with its Partner Entities as well as with their respective or joint end-customers.

At the entrance to a VE a kiosk 110 displays different access pointers 120 to other areas sorted for example by, but not limited to, technology. Each access pointer leads to a sub hall that includes all a resource center, a conference hall that hosts relevant webcasts and moderates chats, booths, etc. A booth may address a single or a plurality of technologies, services, finance, and other access points applicable to the needs of the Super Entity, and these are linked to all halls. A Super Entity having best practice documents, sample contracts, partner enablement tools and the likes, are showcased here. Also, in order to draw attention to, and users into, the environment, the system generating the VE enables the hosting of periodical events such as a weekly session on a fixed schedule. This is of particular value when a new product or service is released and many questions arise during the first months of such introduction.

In accordance with the invention a seamless environment is created by the use of the VE, rather than a paged based view of the prior art on one hand, or a gaming view where a single continuous view of a terrain is provided. In one embodiment of the invention the kiosk 110 may also be used to provide information about web casts that are presented as a billboard by or in front of the kiosk 110. Selecting such a web cast will transfer a user viewing the VE into the web cast. If the web cast is scheduled for a later period of time the user is either automatically registered for future transfer to the web cast when it begins or, in another embodiment, requested to register for the web cast.

In accordance with the invention, under the VE it is possible to create events which may have partial overlaps. An event may have the elements described above. Accordingly, an event may have various display areas that are accessible to any one of a super user, a partner and a visitor, as may be applicable. The interaction of visitors with Super Users and Partner Users also provides leads that enable to further the business of the partner entity and/or the super entity.

Figure 2:
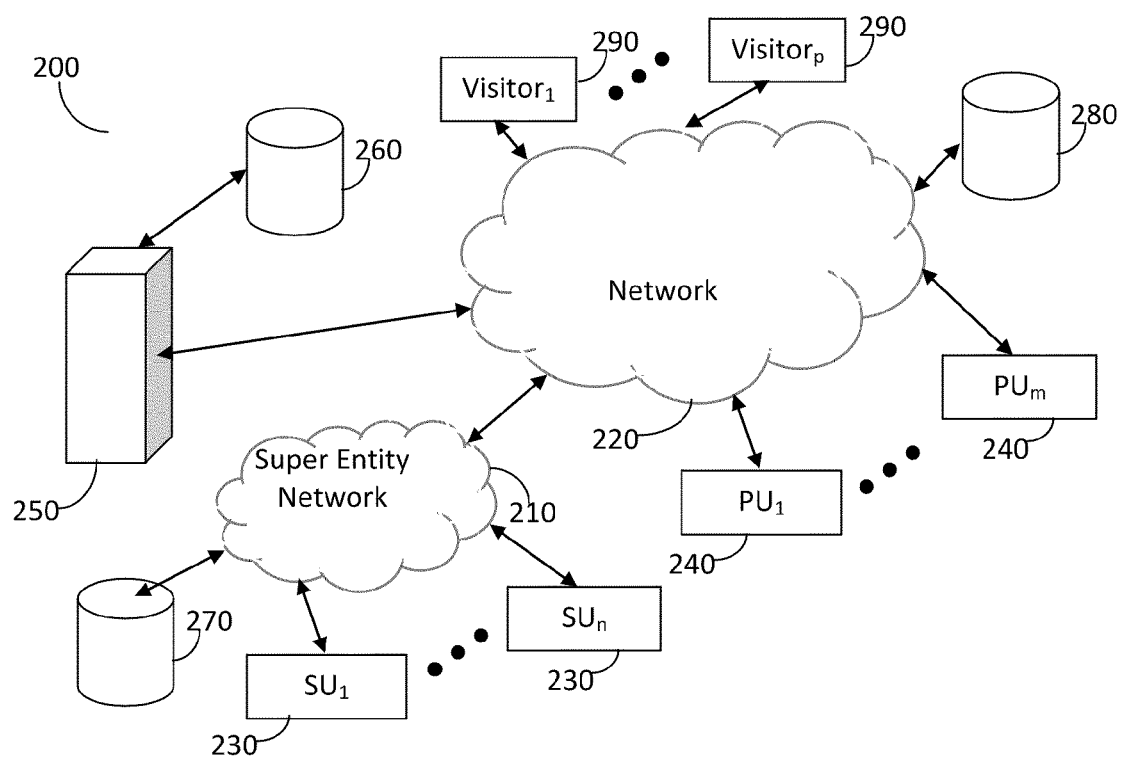
FIG. 2 is an exemplary block diagram of a system implemented in accordance with an embodiment of the invention.

Reference is now made to FIG. 2 where an exemplary and non-limiting diagram of a system 200, implemented in accordance with an embodiment of the invention, is shown. The system 200 comprises a Super Entity network 210 to which Super Users, shown as SUs 230, are connected. The Super Entity network 210 represents an internal network of computers used by the Super Entity to connect its internal users. The network maybe a physical network or, a virtual private network (VPN) implemented over a physical network, or a combination thereof.

Connected to the network 220 is a server 250 that is enabled to provide the VE. Specifically, the server 250 provides an access to a Super User 230 and/or a Partner User 240 from a remote terminal through the Super Entity network 210 for creating at least a virtual event of the VE for display on at least one remote terminal of a visitor 290 that accesses the virtual event. The server 250 is further coupled to a storage 260 that contains at least a database of users which may be Super Users as well as Partner Users all of which have access to the VE. The Super User may have a plurality of divisions each being represented as a separate group of the Super Entity. In some embodiments server 250 may be coupled alternatively or additionally to super entity network 210.

Each Super Entity Group (ESG) and each Partner Entity (PE) may have a profile identifying it and its respective characteristics. Each Super User of the Super Entity or any Entity Group as well as Partner Users may also have a profile that defines their respective characteristics. These profiles may be stored as part of a database stored in a storage unit. Such a storage unit may be a storage unit 260 connected to the server 250 and a storage 270 unit connected to the Super Entity network 210, or a storage unit 280 connected to a network 220. The network 220 may be, but is not limited to, a local area network (LAN), a wide area network (WAN), the worldwide web (WWW), the Internet, a VPN, and any combination thereof, and is further connected to the network 210. In one embodiment the networks 210 and 220 are collapsed into a single network. In addition to SUs 230 and PUs 240 there are also visitors 290 that can access the VE or any virtual event thereof.

PUs 240 are connected to the network 220 either directly or indirectly and further connect their respective Partner Users to the network 220. In accordance with the principles of the invention the server 250 enables the creation of a peer-to-peer (P2P) network of all the Super Users and Partner Users that are part of the VE. This enables them to interact in the VE in an effective way, based on their respective profiles, either personal or the entity to which they belong. Furthermore, the server 250 is further enabled to allow the creation of sub-P2P networks that are comprised of subsets of the users that are part of the VE P2P network.

In accordance with certain exemplary embodiments of the invention, several Partner Users may form a sub-P2P within the VE P2P network, to conduct their business environment with respect to businesses of the Super Entity. A sub-P2P may include one or more Super Users of the Super Entity forming another kind of sub-P2P. In another sub-P2P several Partner Users belonging to different PEs may form a sub-P2P to conduct a joint business with respect to the business of the Super Entity. A sub-P2P may further include one or more Super Users of the Super Entity forming another kind of sub-P2P.

The system 200, through the server 250 is further enabled to allow the creation of a plurality of rooms, booths, and the likes by the Super Entity and/or the Partner Entity as may be necessary and within the restrictions defined based on the profile. Therefore, while one Partner Entity may be allowed to have only a single booth, another Partner Entity may be allowed to have multiple of those or even create rooms within the VE. According to the specific profile building of booths, rooms, and the likes, can take place in either the VCL or VPL, or both, as defined in the respective profile. It should be noted that while a single server 250 is shown, a plurality of servers 250 may be used to achieve the tasks herein. Furthermore, the connection of any one server 250 to the network 210 is merely an example and they may be connected to the network 220 or another sub network.

Any Partner User can have a profile within the system 200. Once a Partner User enters the system 200, if the user does not have a profile yet, the user is presented with a pop-up asking to create or edit a default profile. In the absence of a profile, a Partner User in the system 200 shows only a respective communication menu when searched. A Partner User has a profile page that shows the details provided in the profiles that are intended for exposure. Moreover, these profile details may help in other aspects of the operation of the system 200 disclosed herein. A user profile is linked to the respective partner profile. Using the two levels of profiles it is possible to establish both an internal and an external network of individual users. Therefore, from the user profile there is a link to all the users in the user's "network" and also a "total number of network links". This total number of links is further aggregated to the partner level and presented as part of the Partner Entity profile. By way of example, a first user from a first Partner Entity has 5 links and a second user from the same Partner Entity has 10 links, then the Partner Entity profile shows 15 links in total. Furthermore, a user may use a profile to define a sub-P2P network that may be used to perform business in an enclosed network created for that specific need. A user is further able to send invitation to other users asking them to join the network. Once an invited user accepts an invitation, the user shows up as a network-link in the requestor's profile and the requestor will show up as a network-link on the invited user's profile. In one embodiment of the invention a user can identify a link to be hidden or not. If a link is determined to be hidden then it will not show up in the respective profiles.

In accordance with the invention, profiles may be searched to find specific profiles, either at the Entity level or at the Partner level. It should be noted that in one embodiment only Super Users and Partner Users come up in search results. A user can search for other users based on criteria that combine Super Entity and/or Partner Entity information as well as, when necessary Super User and Partner User information. The search results help in establishing business connections between Partner Entities as well as within Divisions of the Super Entity and the Super Entity and Divisions thereof with the Partner Entities.

In one embodiment of the disclosed invention the search engine is configured to automatically create or identify a representative user for each Entity of the system. In the case of the Super User this may also be true for Divisions thereof. This may be further true for Divisions of Partner Entities which are large enough to have divisions and that are enabled by the Super User to have their own Divisions in the VCE. In one embodiment of the disclosed invention a proactive search agent (PSA) is used so that a user can define a search criteria for the PSA and have the PSA continue searching beyond the providing of an initial set of results. New matches for the given criteria are directed to the user periodically.

The system 200 described hereinabove provides the ability to create a collaborative virtual business environment that is created, under the supervision and restrictions of a Super Entity, but enables the creation of ad-hoc links and virtual locations of a plurality of Partner Entities. By enabling such an environment, business opportunities are open, especially for cases where a large corporation is involved having hundreds or more business partners. The system 200 enables the creation of businesses between each such Partner Entity and the Super Entity, but also between Partner Entities. This makes it easier to establish such connections as the information is gathered in a way that enables such collaboration and provides the virtual locations to achieve same. Moreover, the creation of P2P networks under the VE further allows to foster business between the Entities by providing immediately the means for collaboration within an Entity, between the Super Entity and one or more Partner Entities, within a Partner Entity, as well as between Partner Entities.

Figure 3:
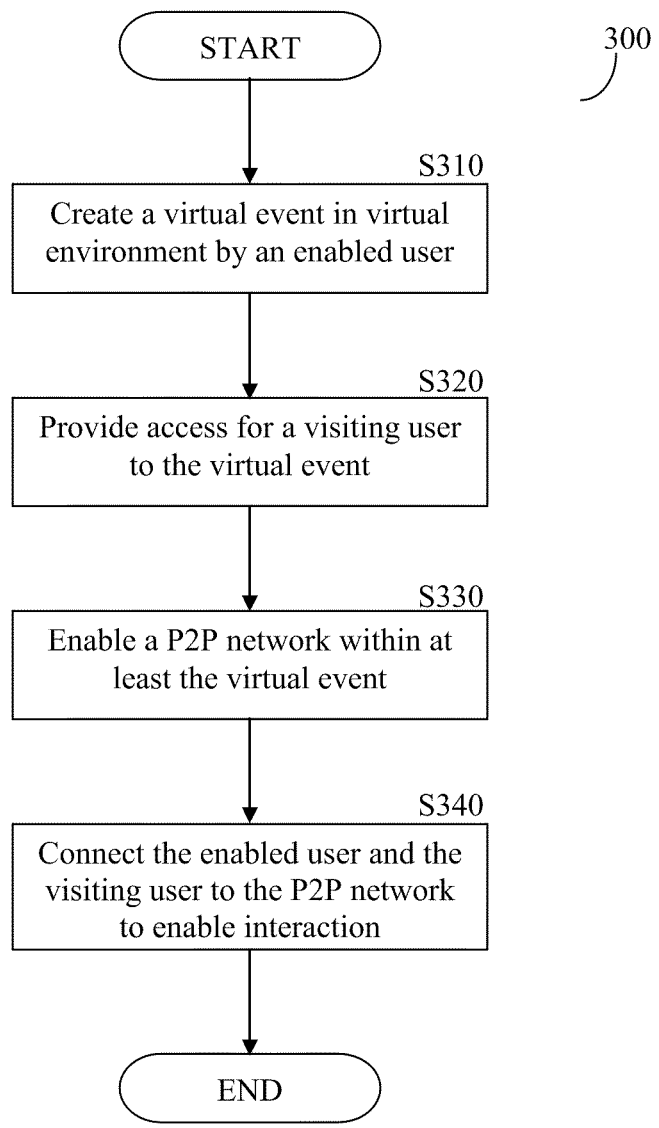
FIG. 3 is an exemplary flowchart of the creation of a virtual event within a virtual environment and the creation of a P2P network.

Reference is now made to FIG. 3 where an exemplary and non-limiting flowchart 300 of the creation of a virtual event within a virtual environment and the creation of a P2P network is shown. In S310 a virtual event, or a portion thereof is created within a VE by an enabled user. In S320 access is provided to a visiting user to the virtual event, or the portion thereof. In S330 a P2P network is enabled within the virtual event or portion thereof. In one embodiment it is the P2P network of the VE. In S340 connection is established between the enabled user and the visiting user to the P2P network so that at least they can interact with each other. In one embodiment connections between a plurality of visiting users is also enabled in the P2P network.

It should be appreciated that in accordance with the invention the VEC is the platform, comprised from example of blocks 250, 260 and/or 270 shown and discussed with respect of FIG. 2 hereinabove, in which an organizer creates and manages Venues that share the same context. The VEC is not a visual environment but a repository that holds and shares resources and settings, and is a console to manage them. The VEC holds: Venues, Locations, Users (Stakeholders with special privileges and Attendees, Sponsors that either own Locations and/or have reporting rights to Venue and/or Events and/or Locations, reports, as well as default settings for various entities. The VEC supports sharing and copying of content and settings within the VEC account.

The Venue is a persistent, virtual world built of Locations, and example of which is shown with respect to FIG. 1, and discussed hereinabove in more detail. The Venue may contain Events within it which may also include live Events. Each Venue has a virtual world structure and navigation, settings, branding and customized user interface, language support, one or more gates to enable access to the Venue, user representations, search scopes, network scopes, and an access control system based on the User details. The Venue defines the scope for Content and User search regardless through which Gate the user entered from.

A Gate is the entrance to a Venue and/or Event. The Gate is the Registration form and a Login window for the Venue and/or Event. The Gates enables the reporting system to track Attendees' activities by the gates they enter a Venue and/or Event.

According to the invention an Event is a scheduled activity, such as but not by way of limitation, single Webcast, or a combination of locations and Webcast sessions that share a common purpose and take place in a Venue for a limited time period. The Event is based on the Venue structure and setting. The Event has an on-demand period. When the on-demand period expires the User is redirected to the Venue's default Gate where the User can access the data on-demand. The Event typically has a dedicated Gate for access purposes.

The VEC further enables for each Venue a reporting system that provides data about Attendees and Attendees' Activities. The reports have viewpoints and scopes. The viewpoints are: by VECNenue/Event/Locations/Content usage, and leads by User. The tracking is per User, the Gate they came through (registered/logged-in) and the Location where the activity took place at. The scopes are: Virtual Event Center Reports—xonsolidated information cross Venues and Events, Venue Reports—cross activity in a Venue, Event Reports—specific Event—all the Locations that are associated with an Event (Event Scope) are marked and grouped for the Reporting purposes, Location Reports—for a specific Location, and Content Item Reports. The Scope is based on the Organizer/Sponsor rights and privileges.

The organizer is an entity that owns one or more Virtual Event Centers. It has the overall responsibility and administration privileges for its Venues and Events under the owned VEC. It manages the VEC via an Organizer Console. The sponsor/owner is entity that takes part in one or more Venues or Events by either owning Locations or Content Items within (public) Locations or by only having Reporting rights to Venues/Events/Locations. A Sponsor can perform one or more of the following: own and manage different Content Items; own and manage Location(s); have reporting rights to Venues and/or Events and/or Locations; and, manages its world via a Sponsor Console. A Location is a place within a Venue that includes Content Items and/or links to other Locations and/or serves as a gathering place that hosts activity. There are different types of Locations: Main hall, Exhibition hall, Conference hall, Booth, Webcast, Lounge, Resource Center, Job Center, some of which are shown in the exemplary and non-limiting FIG. 1. Each Location is owned and managed by a single Sponsor. Each Location can further share reporting rights with one or more Sponsors. Some Locations, such as but without limitation, Job Center, Resource Center, and Lounge, can group Content Items from different Sponsors. Some Locations may have special Users or Stakeholders, these include but are not limited to: booths that are staffed Live by Representatives; and Webcasts that are staffed by producers and speakers. Some Locations such as Webcasts can further host scheduled activities. A Content Item is, for example but without limitation, a file, products, job descriptions, forums, and more, that is placed in one or more Locations and is accessed and viewed by Attendees, and is owned by a Sponsor.

In an exemplary and non-limiting use of the VEC a customer may conduct a plurality of Events using the same Venue. The Events may be performed in parallel or in sequence, or a combination thereof. However, the same customer may also have a plurality of different Venues each having one or more Events using the same VEC. Hence the disclosed inventions provide for maximum flexibility in the handling and management of Virtual Events. Some items can be further saved in an Attendee's briefcase, i.e., an area designated under the VEC for the storage of Attendee related content.

In accordance with the invention Each entity (Organizer, VEC, Venue, Event, Sponsor, Location, Content item) is associated with one or more Administrators (User with Administration privileges). Those users manage the entity. The Organizer and the respective VEC, Venues and Events are grouped and managed by an Organizer Administrator. The Sponsor and its respective Locations and Content Items are grouped and managed by a Sponsor Administrator.

Furthermore, in accordance with the invention, a user has a unique id and credentials in the VEC. At the VEC level each User has: a master profile and privileges such that changes in a User profile are reflected in all Venues and/or Events of the User, including, for example those which happened in the past; a briefcase with saved content; and, an inter-person network. The system in accordance with the invention defines two types of users: attendees and stakeholders. An attendee is a User that registers/visits a Venue and/or Event with activities tracked and viewable in the reports. The Attendee representation (Business card and Personal page) is defined per each Venue/Event. The attendee representation is defined per VEC. A stakeholder is a user with special privileges for managing an entity, accessing the reports or staffing a Location in a Venue. These include Organizer and Sponsor Administrators, Booth Representatives, and Webcast Producers and Speakers.

The invention has been described hereinabove with respect to a specific embodiment for creating a VE. However, one of ordinary skill in the art can easily adapt the teachings described hereinabove to create other environments which are not strictly business, or not business at all.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPUs"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

What we claim is:

1. A system for creation of venues, comprising: at least one server; at least one non-transitory storage unit connected to the at least one server; a network connected to the at least one server; at least a super user of a super entity connected to the network, the super entity enforcing design constraints for a venue; and executable code in the at least one storage unit, the executable code accessible by a partner user of the system from a first remote terminal through the network for creating at least a portion of a virtual event of the venue for display on at least a second remote terminal of a visiting user that accesses at least the virtual event, the partner user having reporting rights to the venue, the virtual event being stored on the at least one storage unit, and further enabling the partner user to create a peer to peer network for the venue comprising at least the partner user and the visiting user, wherein the venue peer to peer network enables at least one of sharing of content between peers attending the virtual event and collaboration between peers attending the virtual event, the system further comprising a reporting system that is configured to generate one or more reports regarding the venue and provide the one or more reports to the partner user having reporting rights to the venue, wherein the executable code provides the venue such that the venue is a point of entry for the visiting user and wherein the executable code creates a virtual partner lounge that provides a point of entry for the super user and the partner user.

2. The system of claim 1, wherein the visiting user is at least one of a super user, a partner user, or a visitor.

3. The system of claim 1, further comprising: a peer-to-peer network comprising at least two of: the super user, the enabled user and the visiting user.

4. The system of claim 1, further comprising: a profile stored in the at least one storage unit.

5. The system of claim 4, wherein the profile is a profile of at least one of the super entity, a partner entity, the enabled user, or the visiting user.

6. The system of claim 5, wherein the profile contains a value which corresponds to a number of links between the super user, or the enabled user, or visiting user to other users of the system.

7. The system of claim 5, wherein the profile of the super entity or the partner entity contains a value which corresponds to an aggregation of links of all respective users of the super entity or a partner entity.

8. The system of claim 4, wherein the one or more servers is enabled to access the profile for the purpose of searching and creating a network of users of the virtual environment (VE).

9. The system of claim 8, wherein creating the network of users further includes the generation of leads that are provided to at least one of the super entity and a partner entity.

10. The system of claim 1, wherein the venue comprises at least a virtual super user lounge and a virtual partner lounge, wherein access from the virtual super user lounge to the virtual partner lounge is enabled to only the super user and the partner users.

11. The system of claim 1, wherein the partner user is enabled to invite another super user or an enabled user to form a sub peer-to-peer network.

12. The system of claim 1, wherein the system is enabled to have a plurality of virtual events wherein at least two virtual events have a partial overlap.

13. A virtual environment center (VEC) server comprising: a processing unit; a non-transitory memory unit coupled to the processing unit; an interface to a network; executable code in the memory unit the executable code provided accessible by a partner user connected to the VEC server from a first remote terminal through the network for creating within a venue at least a portion of a virtual event of the venue for display on at least a second remote terminal of a visiting user that accesses at least the virtual event that is stored on the memory, and further enabling at least the partner user to create a peer to peer network for the partner user and the visiting user; wherein design constraints for the venue are enforced by at least a super user of a super entity, the venue enabling collaboration between users that are super users, partner users and visiting users of the virtual event; wherein a venue enables at least one of sharing of content between peers attending the virtual event and collaboration between peers attending the virtual event, the server further comprising a reporting unit that is configured to generate one or more reports regarding the venue and provide the one or more reports to the partner user, wherein the executable code provides the venue such that the venue is a point of entry for the visiting users and wherein the executable code creates a virtual partner lounge that provides a point of entry for the super users and the partner users.

14. The VEC server of claim 13, wherein the visiting user is a super user, a partner user, or a visitor.

15. The VEC server of claim 13, further comprising: a peer-to-peer network comprising at least two of: the super user, the enabled user, and the visiting user.

16. The VEC server of claim 13, further comprising: a profile stored in the memory.

17. The VEC server of claim 16, wherein the profile is a profile of at least one of the super entity, a partner entity, the enabled user, or the visiting user.

18. The VEC server of claim 17, wherein the profile contains a value which corresponds to a number of links between the super user, or the enabled user, or the visiting user to other users of the VEC server.

19. The VEC server of claim 17, wherein the profile of the super entity or the partner entity contains a value which corresponds to an aggregation of links of all respective users of the super entity or a partner entity.

20. The VEC server of claim 16, wherein the server is enabled to access the profile for the purpose of searching for and creating a network of users of the venue.

21. The VEC server of claim 20, wherein creating the network of users further includes the generation of leads that are provided to at least one of the super entity, and a partner entity.

22. The VEC server of claim 13, wherein the venue comprises at least a virtual super user lounge and a virtual partner lounge, wherein access from the virtual super user lounge to the virtual partner lounge is enabled to only the super user and the partner users.

23. The VEC server of claim 13, wherein partner user is enabled to invite another user which is a super user or an enabled user to form a sub peer-to-peer network.

24. The VEC server of claim 13, wherein the VEC server is enabled to have a plurality of virtual events wherein at least two virtual events have a partial overlap.

* * * * *